(12) United States Patent
Singer

(10) Patent No.: US 7,472,164 B2
(45) Date of Patent: Dec. 30, 2008

(54) SYSTEM AND METHOD FOR IDENTIFYING SPOOFED EMAIL BY MODIFYING THE SENDER ADDRESS

(75) Inventor: David S. Singer, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 10/754,220

(22) Filed: Jan. 9, 2004

(65) Prior Publication Data

US 2005/0188024 A1     Aug. 25, 2005

(51) Int. Cl.
*G06F 15/16* (2006.01)
*G06F 15/173* (2006.01)
*G06F 15/177* (2006.01)

(52) U.S. Cl. ...................... 709/206; 709/249

(58) Field of Classification Search ......... 709/200–206, 709/217–228, 249
See application file for complete search history.

(56) References Cited

U.S. PATENT DOCUMENTS

| | | | |
|---|---|---|---|
| 6,072,942 A | 6/2000 | Stockwell et al. | |
| 6,266,692 B1 | 7/2001 | Greenstein | |
| 6,321,267 B1 | 11/2001 | Donaldson | |
| 6,356,935 B1 | 3/2002 | Gibbs | |
| 2003/0233418 A1* | 12/2003 | Goldman | 709/206 |
| 2004/0148356 A1* | 7/2004 | Bishop et al. | 709/206 |
| 2004/0193691 A1* | 9/2004 | Chang | 709/206 |

FOREIGN PATENT DOCUMENTS

WO    WO 01/38999    5/2001

\* cited by examiner

*Primary Examiner*—Haresh N Patel
(74) *Attorney, Agent, or Firm*—John E. Campbell; Stephen Bongini; Fleit Gibbons Gutman Bongini & Bianco P.L.

(57) ABSTRACT

A system, method and computer program product are provided for identifying spoofed emails. According to the method, an email addressed to a recipient in a first network is received, with the email including a plurality of headers, and at least one of the plurality of headers including a sender address. It is determined whether the sender address indicates a mailbox from within the first network, and the sender address is modified if it indicates a mailbox within the first network. The email with the modified sender address is sent to the recipient. In one embodiment, a second email is received that is from the recipient and that is addressed to the modified sender address, the modified sender address is modified so as to return it to its original form, and the second email is sent.

2 Claims, 11 Drawing Sheets

| | | |
|---|---|---|
| from | "From:" mailbox-list CRLF | 212 |
| sender | "Sender:" mailbox CRLF | 214 |
| reply-to | "Reply-To:" mailbox-list CRLF | 216 |
| resent-sender | "Resent-Sender:" mailbox CRLF | 218 |
| resent-from | "Resent-From:" mailbox-list CRLF | 220 |
| resent-reply-to | "Resent-Reply-To:" mailbox-list CRLF | 224 |

FIG. 2

From: sam.spoofer@example.com ⟋ 402

To: recipient@example.com ⟋ 404

Subject: Great Idea! ⟋ 406

Date: 01 April 2003 11:22:33-0000 ⟋ 408

HA! Made You look! ⟋ 410

FIG. 4

From: sam.spoofer@externalto.example.com  / 502

To: recipient@example.com  / 404

Subject: Great Idea!  / 406

Date: 01 April 2003 11:22:33-0000  / 408

HA! Made You look!  / 410

FIG. 5

| | | |
|---|---|---|
| 802 | to | "To:" address-list CRLF | 814
| 804 | cc | "CC:" address-list CRLF | 816
| 806 | bcc | "bcc:" (address-list/[CFWS]) CRLF | 818
| 808 | resent-to | "Resent-To:" address-list CRLF | 820
| 810 | resent-cc | "Resent-cc:" address-list CRLF | 822
| 812 | resent-bcc | "Resent-bcc:" (address-list/[CFWS]) CRLF | 824

FIG. 8

To: target@example.org / 902

From: recipient@example.com / 904

CC: colleague@externalto.example.com / 905

Subject: Did you see this? / 906

Date: 01 April 2003 12:22:33-0000 / 908

I got email claiming to be from my colleague. / 910
Luckily, the anti-spoofing caught it.

FIG. 9

To: target@example.org — 902

From: recipient@example.com — 904

CC: colleague@example.com — 1002

Subject: Did you see this? — 906

Date: 01 April 2003 12:22:33-0000 — 908

I got email claiming to be from my colleague. Luckily, the anti-spoofing caught it. — 910

SYSTEM AND METHOD FOR IDENTIFYING SPOOFED EMAIL BY MODIFYING THE SENDER ADDRESS

BACKGROUND OF THE INVENTION

1. Field of the Invention

This invention generally relates to the field of electronic messaging and more specifically to the identification of spoofed electronic messages.

2. Description of Related Art

Internet electronic mail (email) was created in an environment where there were relatively few users of the system, most of whom were known to one another (either directly or through a very short chain of acquaintances), and where it was reasonable to be able to trust information supplied by other users (for example, the user's name and email address). With the growth of the Internet, however, those assumptions have proven not to be tenable, and there is now a large industry of spammers—people who send unsolicited email to millions of recipients in the hopes of getting them to read the email and respond to it. At present, the millions of people who use email are being overwhelmed by billions of unwanted email messages. Surveys show spam now accounts for about half of all email and frequently includes messages that are fraudulent or pornographic. Email is also used to spread viruses and worms. In order for the virus to spread, the email must be opened by the recipient (rather than being discarded unread).

In both of these cases, one of the tricks that the sender uses to cause the recipient to open the email is "spoofing"—pretending to send email from an address other than the sender's own, one which the recipient may be more likely to trust (for example, another user in the same company).

Therefore a need exists to overcome the problems discussed above, and particularly for a way to more efficiently identify spoofed email.

SUMMARY OF THE INVENTION

Briefly, in accordance with the present invention, disclosed is a system, method and computer program product for identifying spoofed emails. In a method according to a preferred embodiment of the present invention, an email addressed to a recipient in a first network is received, with the email including a plurality of headers, and at least one of the plurality of headers including a sender address. It is determined whether the sender address indicates a mailbox from within the first network, and the sender address is modified if it indicates a mailbox within the first network. The email with the modified sender address is sent to the recipient. In one embodiment, a second email is received that is from the recipient and that is addressed to the modified sender address, the modified sender address is modified so as to return it to its original form, and the second email is sent.

Also disclosed is a computer system for identifying spoofed emails. The computer system includes a receiver that receives an email addressed to a recipient in a first network, with the email including a plurality of headers, and at least one of the plurality of headers including a sender address. The computer system also includes a processor that determines whether the sender address indicates a mailbox from within the first network, and modifies the sender address if it indicates a mailbox from within the first network. A transmitter sends the email with the modified sender address to the recipient.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 2 is a chart showing a list of header fields and header field formats.

FIG. 4 shows the text of an exemplary email before the process of receiving an email in one embodiment of the present invention.

FIG. 5 shows the text of the email of FIG. 4 after the process of receiving an email in one embodiment of the present invention.

FIG. 8 is a chart showing a list of header fields and header field formats.

FIG. 9 the text of an exemplary email before the process of sending an email in one embodiment of the present invention.

FIG. 10 the text of the email of FIG. 9 after the process of sending an email in one embodiment of the present invention.

DETAILED DESCRIPTION OF PREFERRED EMBODIMENTS

1. Introduction

The present invention, according to a preferred embodiment, overcomes problems with the prior art by providing an efficient and easy-to-implement method for identifying spoofed email. The present invention makes it extremely difficult, if not impossible, for a malicious sender outside of a network, company, Internet domain, Intranet or enterprise to pretend to be a user within that network, so as to make it less likely that a recipient will open harmful or spam email based on the apparent sender. The present invention substantially prevents senders outside of a network from sending email to recipients within that network while falsely claiming that the email originated within the network. Such spoofed email is processed to indicate its external origin before it is received by the intended recipient. Preferably, the system still allows the recipient to reply to the sender.

2. Overview of the System

Figure 1:
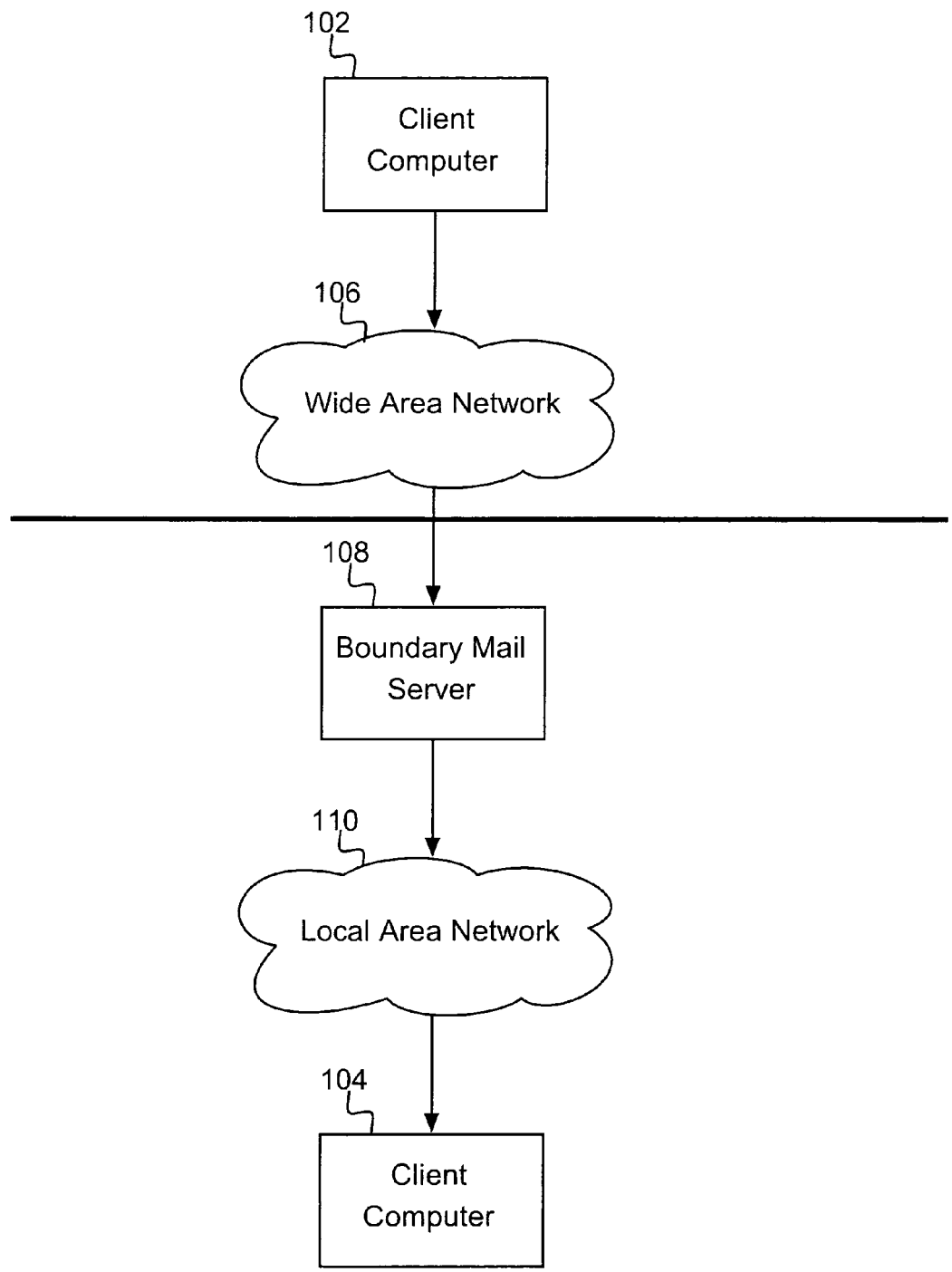
FIG. 1 is a block diagram illustrating the process of receiving an email in one embodiment of the present invention.

FIG. 1 is a block diagram illustrating the process of receiving an email in one embodiment of the present invention. FIG. 1 also shows the overall system architecture of one embodiment of the present invention. FIG. 1 shows client computers 102 and 104 operated by users. FIG. 1 also shows a boundary mail server 108, which provides email processing functions to the local area network (LAN) 110 and is described in greater detail below. The boundary mail server 108 comprises any commercially available email server system that can be programmed to offer the functions of the present invention.

FIG. 1 shows the path of an incoming email in this embodiment of the present invention. A client computer 102 sends an email that travels through a wide area network 106 and is received by a boundary mail server 108, where it is processed according to the present invention. Next, the processed email is sent to the recipient, client computer 104, via local area network 110. This process is described in greater detail with reference to FIG. 3 below.

In preferred embodiments of the present invention, the computer systems of client computers 102 and 104 and boundary mail server 108 are one or more Personal Computers (PCs) (e.g., IBM or compatible PC workstations running the Microsoft Windows operating system or Linux OS, Macintosh computers running the Mac OS operating system, or equivalent), Personal Digital Assistants (PDAs), hand held computers, palm top computers, smart phones, game consoles or any other information processing devices. In other embodiments, the computer systems of one or more of client computers 102 and 104 and boundary mail server 108 are a server system (e.g., SUN Ultra workstations running the SunOS operating system, IBM RS/6000 workstations and servers running the AIX operating system, or an IBM zSeries eServer running z/OS, z/VM or Linux OS). An exemplary computer system for client computers 102 and 104 and boundary mail server 108 is described in greater detail below with reference to FIG. 11.

In an embodiment of the present invention, the wide area network (WAN) 106 is a circuit switched network, such as the Public Service Telephone Network (PSTN). In another embodiment, the network 106 is a packet switched network. The packet switched network is a wide area network (WAN), such as the global Internet, a private WAN, a telecommunications network or any combination of the above-mentioned networks. In yet another embodiment, the network 106 is a wired network, a wireless network, a broadcast network or a point-to-point network.

In an embodiment of the present invention, the LAN 110 is a circuit switched network, such as the Public Service Telephone Network (PSTN). In another embodiment, the network 110 is a packet switched network. The packet switched network is a local area network (LAN), a telecommunications network or any combination of the above-mentioned networks. In yet another embodiment, the network 110 is a wired network, a wireless network, a broadcast network or a point-to-point network.

It should be noted that although boundary mail server 108 and client computer 104 are shown as separate entities in FIG. 1, the functions of both entities may be integrated into one entity. It should also be noted that although FIG. 1 shows two client computers 102 and 104, the present invention supports any number of client computers.

3. Email Messages

Currently, "Request for Comments 2822", published by the Internet Society in April 2001 (and available on the Internet at www.ietf.org/rfc/rfc2822.txt?number=2822) is the industry standard that specifies a syntax for email text messages that are sent between computer users. This document is herein incorporated by reference. Section 2 of "Request for Comments 2822" (RFC 2822) provides a lexical analysis of a standard email message. Specifically, RFC 2822 describes an email as consisting of multiple header fields followed, optionally, by a body. The header fields are a sequence of lines of characters with special syntax as defined in RFC 2822. The body is simply a sequence of characters that follows the header fields and is separated from the header fields by an empty line (i.e., a line with nothing preceding the Carriage Return Line Feed, or CRLF).

Header fields are lines composed of a field name, followed by a colon (":"), followed by a field body, and terminated by CRLF. A field name MUST be composed of printable US-ASCII characters (i.e., characters that have values between 33 and 126, inclusive), except colon. A field body may be composed of any US-ASCII characters, except for CR and LF.

Some field bodies in this standard are defined simply as "unstructured" (which is specified as any US-ASCII characters, except for CR and LF) with no further restrictions. These are referred to as unstructured field bodies. Semantically, unstructured field bodies are simply to be treated as a single line of characters with no further processing.

Some field bodies in this standard have specific syntactical structure more restrictive than the unstructured field bodies described above. These are referred to as "structured" field bodies. Structured field bodies are sequences of specific lexical tokens. Many of these tokens are allowed (according to their syntax) to be introduced or end with comments as well as the space (SP, ASCII value 32) and horizontal tab (HTAB, ASCII value 9) characters (together known as the white space characters, WSP), and those WSP characters are subject to header "folding" and "unfolding".

RFC 2822 further describes that at least one of the multiple header fields includes an address. Addresses occur in several header fields to indicate senders and recipients of messages. An address may either be an individual mailbox, or a group of mailboxes. A mailbox receives mail. It is a conceptual entity that does not necessarily pertain to file storage. For example, some sites may choose to print mail on a printer and deliver the output to the addressee's desk.

Normally, a mailbox is comprised of two parts: (1) an optional display name that indicates the name of the recipient (which could be a person or a system) that could be displayed to the user of an email application, and (2) an addr-spec address enclosed in angle brackets ("<" and ">"). There is also an alternate simple form of a mailbox where the addr-spec address appears alone, without the recipient's name or the angle brackets.

When it is desirable to treat several mailboxes as a single unit (i.e., in a distribution list), the group construct can be used. The group construct allows the sender to indicate a named group of recipients. This is done by giving a display name for the group, followed by a colon, followed by a comma separated list of any number of mailboxes (including zero and one), and ending with a semicolon. Because the list of mailboxes can be empty, using the group construct is also a simple way to communicate to recipients that the message was sent to one or more named sets of recipients, without actually providing the individual mailbox address for each of those recipients.

FIG. 2 is a chart showing an exemplary list of common header fields and header field formats. Specifically, FIG. 2 shows common header fields and header field formats that are pertinent to identifying possibly spoofed email messages. A more detailed list of header fields and formats can be found in sections 2 and 3.6 of "Request for Comments 2822" described above.

The format for the "from" header field 202 is shown in cell 212. This format consists of the characters "From:" followed by a list of mailboxes and a Carriage Return Line Feed (CRLF). The format for the "sender" header field 204 is shown in cell 214. This format consists of the characters "Sender:" followed by a mailbox and a CRLF. The format for the "reply-to" header field 206 is shown in cell 216. This format consists of the characters "Reply-To:" followed by a list of mailboxes and a CRLF. The format for the "resent-sender" header field 208 is shown in cell 218. This format consists of the characters "Resent-Sender:" followed by a mailbox and a CRLF. The format for the "resent-from" header field 210 is shown in cell 220. This format consists of the characters "Resent-From:" followed by a list of mailboxes and a CRLF. The format for the "resent-reply-to" header field 222 is shown in cell 224. This format consists of the characters "Resent-Reply-To:" followed by a list of mailboxes and a CRLF. Note that the case of the characters that appear in a header field is immaterial, as explained in RFC 2822.

4. Processing Incoming Email Messages

Figure 3:
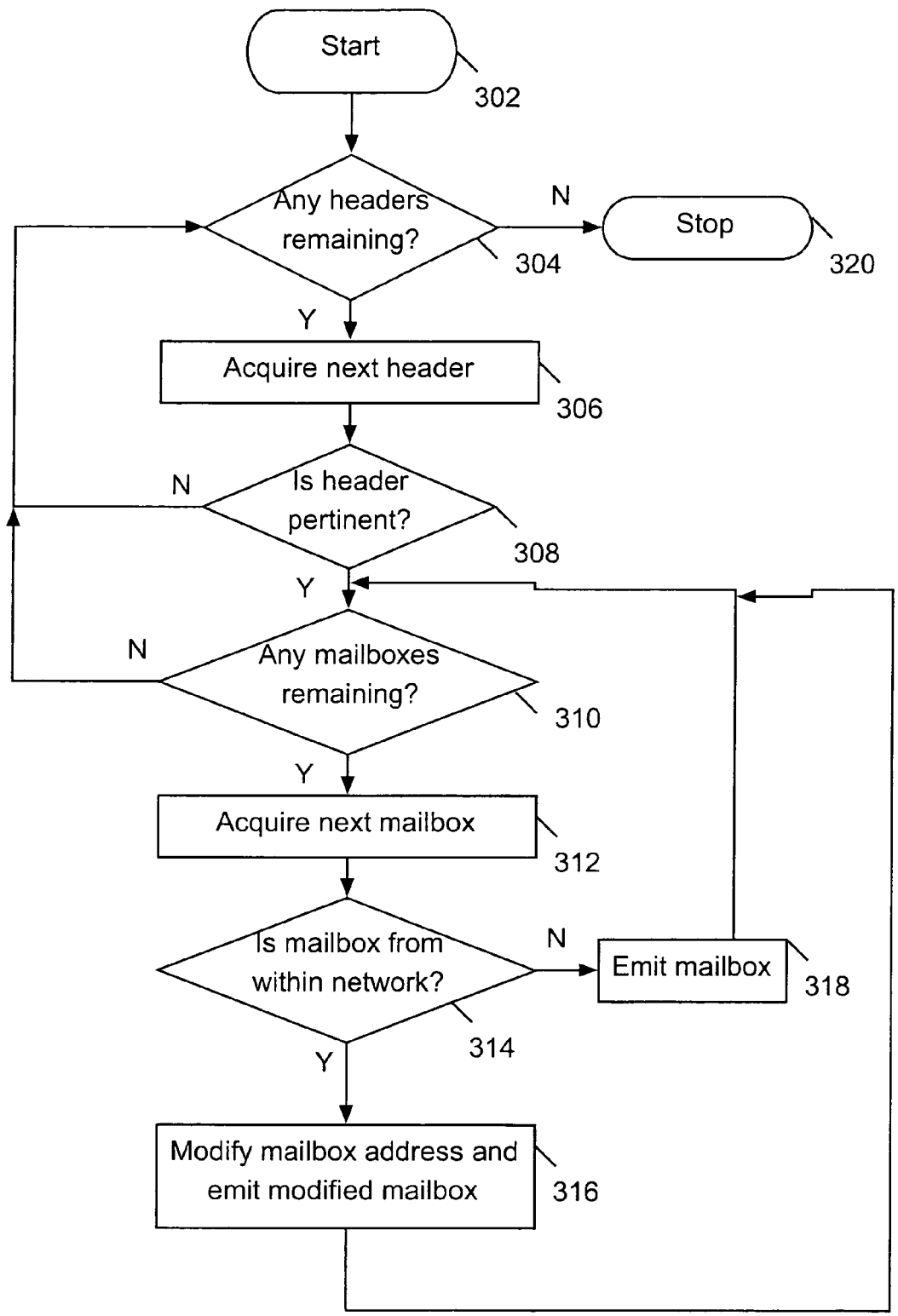
FIG. 3 is a flowchart depicting the overall operation and control flow of the process of receiving an email in one embodiment of the present invention.

FIG. 3 is a flowchart depicting the overall operation and control flow of the process of receiving an email in one embodiment of the present invention. The operation and control flow of FIG. 3 depicts the processing of incoming email messages so as to allow a recipient to identify an email message that has not originated from within the recipient's local network. Specifically, the control flow of FIG. 3 depicts the actions taken by the boundary mail server 108 in this embodiment upon receiving each incoming email message. The operation and control flow of FIG. 3 begins with step 302 and proceeds directly to step 304.

In step 304, the boundary mail server 108 determines whether there are any header fields remaining to be processed. The boundary mail server 108 iterates through each header field of an incoming email message and processes it. If the result of the determination of step 304 is positive, then control flows to step 306. If the result of the determination of step 304 is negative, then control flows to step 320. In step 306, the boundary mail server 108 acquires, or reads, the next header field of the incoming email message according to the syntax rules for header fields described in "Request for Comments 2822."

In step 308, the boundary mail server 108 determines whether the current header field is pertinent. In one embodiment, the boundary mail server 108 considers any header field specified in FIG. 2 as pertinent. This is because FIG. 2 shows common header fields and header field formats that are pertinent to identifying possibly spoofed email messages. If the result of the determination of step 308 is positive, then control flows to step 310. If the result of the determination of step 308 is negative, then control flows to step 304. Note that any headers and mailboxes that are not modified during this email receiving process are passed through unchanged, along with the body of the email.

In step 310, the boundary mail server 108 determines whether there are any mailboxes in the current header field remaining to be processed. The boundary mail server 108 iterates through each mailbox in the current header field of an incoming email message and processes it. If the result of the determination of step 310 is positive, then control flows to step 312. If the result of the determination of step 310 is negative, then control flows to step 304. In step 312, the boundary mail server 108 acquires, or reads, the next mailbox in the current header field of the incoming email message according to the syntax rules for mailboxes described in "Request for Comments 2822".

In step 314, the boundary mail server 108 determines whether the current mailbox claims to originate from inside the same network (such as LAN 110) or the same enterprise as the recipient computer, client computer 104. If the result of the determination of step 314 is positive, then control flows to step 316. If the result of the determination of step 314 is negative, then control flows to step 318.

In step 316, the address of the mailbox is modified so as to identify the mailbox as a possibly spoofed email message. In one embodiment of the present invention, an extra domain is added to the beginning of the mailbox address (that is, a sub-domain is added to the domain), with the extra domain text being used to indicate a possibly spoofed email message. For example, if the original address of the mailbox was "sam.spoofer@example.com", then the address of the mailbox is modified so as to be "sam.spoofer@externaltb.example.com" or so as to be "sam.spoofer@notfromhere.example.com". The added "externalto" or "notfromhere" text (i.e., sub-domain) is used to indicate that the email message originated from a network external to the LAN 110 of the recipient computer 104 in this embodiment. The modified mailbox is then emitted, or allowed to pass through the processing phase. In step 318, the mailbox is emitted, or allowed to pass through the processing phase. In step 320, the control flow of FIG. 3 stops.

FIG. 4 shows the text of an exemplary email message before the process of receiving an email in one embodiment of the present invention. More specifically, FIG. 4 shows the text of an email message before the control flow of FIG. 3 is executed. FIG. 4 shows that the text of the email message contains a "from" field 402, a "to" field 404, a "subject" field 406, a "date" field 408 and a "body" field 410. Note that the address of the "from" field 402 has not been modified yet.

FIG. 5 shows the text of the email message of FIG. 4 after the process of receiving an email in one embodiment of the present invention. More specifically, FIG. 5 shows the text of the email message after the control flow of FIG. 3 is executed. FIG. 5 shows that the text of the email message contains the same "to" field 404, "subject" field 406, "date" field 408 and "body" field 410 as FIG. 4. However, the address of the "from" field 502 has been modified. Whereas the original address in the "from" field 402 was "sam.spoofer@example.com", the address of the "from" field 502 is modified to be "sam.spoofer@externalto.example.com". Note that the "externalto" text indicates that the email message originated from a network external to the LAN 110 of the recipient computer 104 in this embodiment. This change can then be used by the recipient, or by computer programs running on behalf of the recipient, as an indication of a possibly suspicious email.

As explained above, preferred embodiments of the present invention modify the sender's address in such a way as to mark it as not being verifiably from the recipient's network and hence, suspect. However, the marking should be carried out in such a way as to allow the recipient of the email to correspond with the sender if that is required. This is because there are legitimate reasons for mail to be sent to a network with an apparent origin within the network (for example, email sent from an enterprise to an email reflector outside the network and then distributed to users within the network). As explained above, one such method of marking the mailbox includes prefacing the domain part of the mailbox with a unique sub-domain, such as "externalto". Email to this sub-domain will be delivered as if the sub-domain were not part of the mailbox.

5. Processing Outgoing Email Messages

Figure 6:
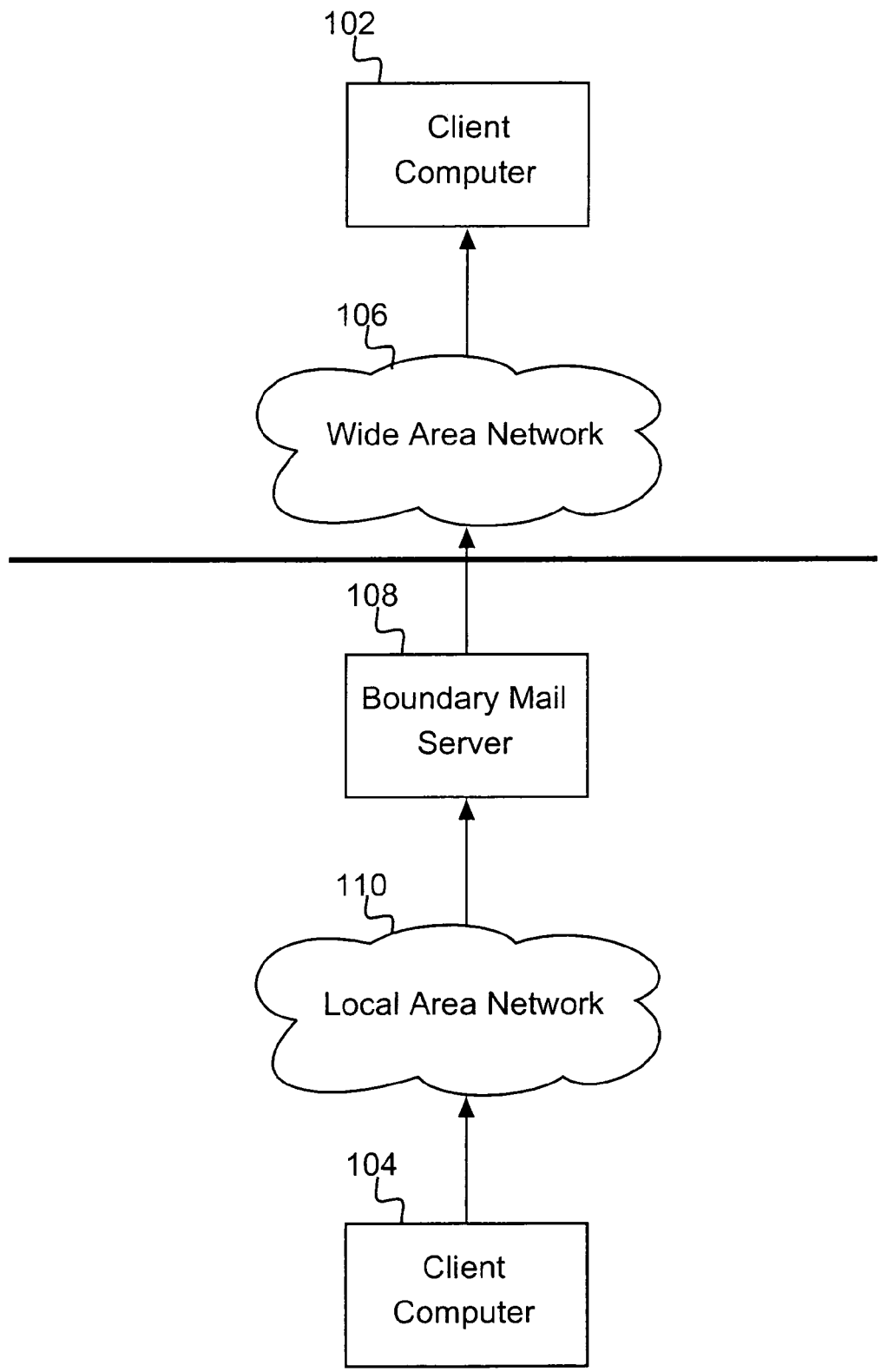
FIG. 6 is a block diagram illustrating the process of sending an email in one embodiment of the present invention.

FIG. 6 is a block diagram illustrating the process of sending an email in one embodiment of the present invention. FIG. 6 also shows the overall system architecture of one embodiment of the present invention, as depicted in FIG. 1. The client computers 102 and 104, the boundary mail server 108, WAN 106 and LAN 110 are identical to those described in FIG. 1.

FIG. 6 shows the path of an outgoing email message in this embodiment of the present invention. A client computer 104 (previously the recipient) sends an email that travels through the LAN 110 and is received by the boundary mail server 108, where it is processed according to the present invention. Next, the processed email message is sent to the new recipient, client computer 102, via WAN 106. This process is described in greater detail below with reference to FIG. 7.

FIG. 8 is a chart showing an exemplary list of common header fields and header field formats. Specifically, FIG. 8 shows common header fields and header field formats that are pertinent to identifying addresses that have been modified by the control flow of FIG. 3. A more detailed list of header fields and formats can be found in sections 2 and 3.6 of "Request for Comments 2822" described above.

The format for the "to" header field 802 is shown in cell 814. This format consists of the characters "To:" followed by a list of addresses and a CRLF. The format for the "cc" header field 804 is shown in cell 816. This format consists of the characters "CC:" followed by a list of addresses and a CRLF. The format for the "bcc" header field 806 is shown in cell 818. This format consists of the characters "bcc:" followed by a list of addresses, a Comment and/or Folding White Space (CFWS) and a CRLF. The format for the "resent-to" header field 808 is shown in cell 820. This format consists of the characters "Resent-To:" followed by a list of addresses and a CRLF.

The format for the "resent-cc" header field 810 is shown in cell 822. This format consists of the characters "Resent-cc:" followed by a list of addresses and a CRLF. The format for the "resent-bcc" header field 812 is shown in cell 824. This format consists of the characters "Resent-bcc:" followed by a list of addresses, a CFWS and a CRLF. Note that the case of the characters that appear in a header field is immaterial, as explained in RFC 2822.

Figure 7:
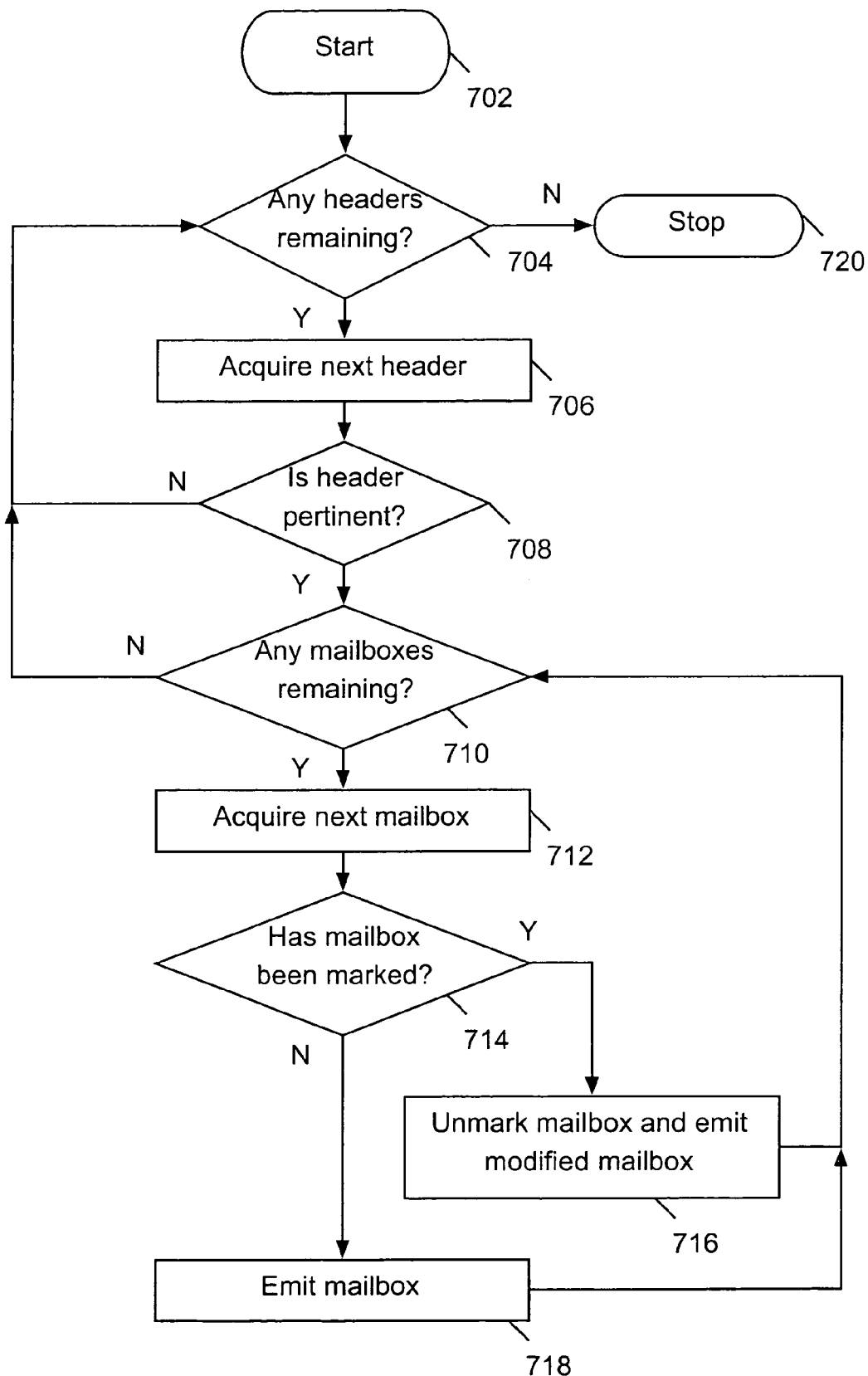
FIG. 7 is a flowchart depicting the overall operation and control flow of the process of sending an email in one embodiment of the present invention.

FIG. 7 is a flowchart depicting the overall operation and control flow of the process of sending an email in one embodiment of the present invention. The operation and control flow of FIG. 7 depicts the processing of outgoing email messages so as to allow the sender to send an email message to a recipient whose address has been modified by the control flow of FIG. 3. Specifically, the control flow of FIG. 7 depicts the actions taken by the boundary mail server 108 in this embodiment upon receiving each outgoing email message. The operation and control flow of FIG. 7 begins with step 702 and proceeds directly to step 704.

In step 704, the boundary mail server 108 determines whether there are any header fields remaining to be processed. The boundary mail server 108 iterates through each header field of an outgoing email message and processes it. If the result of the determination of step 704 is positive, then control flows to step 706. If the result of the determination of step 704 is negative, then control flows to step 720. In step 706, the boundary mail server 108 acquires, or reads, the next header field of the incoming email message.

In step 708, the boundary mail server 108 determines whether the current header field is pertinent. In one embodiment, the boundary mail server 108 considers any header field specified in FIG. 8 as pertinent. This is because FIG. 8 shows common header fields and header field formats that are pertinent to identifying addresses that have been modified by the control flow of FIG. 3. If the result of the determination of step 708 is positive, then control flows to step 710. If the result of the determination of step 708 is negative, then control flows to step 704.

In step 710, the boundary mail server 108 determines whether there are any mailboxes in the current header field remaining to be processed. The boundary mail server 108 iterates through each mailbox in the current header field of an incoming email message and processes it. If the result of the determination of step 710 is positive, then control flows to step 712. If the result of the determination of step 710 is negative, then control flows to step 704. In step 712, the boundary mail server 108 acquires, or reads, the next mailbox in the current header field of the incoming email message.

In step 714, the boundary mail server 108 determines whether the current mailbox has been marked or otherwise modified by the control flow of FIG. 3. If the result of the determination of step 714 is positive, then control flows to step 716. If the result of the determination of step 714 is negative, then control flows to step 718.

In step 716, the address of the mailbox is modified to its original state. In one embodiment of the present invention, the extra domain that was added in the control flow of FIG. 3 is deleted. For example, if the address of the mailbox was "sam.spoofer@externalto.example.com", then the address of the mailbox is modified to be "sam.spoofer@example.com". The modified mailbox is then emitted, or allowed to pass through the processing phase. In step 718, the mailbox is emitted, or allowed to pass through the processing phase. In step 720, the control flow of FIG. 7 stops.

FIG. 9 shows the text of an exemplary email before the process of sending an email in one embodiment of the present invention. More specifically, FIG. 9 shows the text of an email message before the control flow of FIG. 7 is executed. FIG. 9 shows that the text of the email message contains a "To" field 902, a "From" field 904, a "CC" field 905, a "Subject" field 906, a "Date" field 908 and a "Body" field 910. Note that the address of the "CC" field 905 has not been modified yet.

FIG. 10 shows the text of the email message of FIG. 9 after the process of sending an email in one embodiment of the present invention. More specifically, FIG. 10 shows the text of the email message after the control flow of FIG. 7 is executed. FIG. 10 shows that the text of the email message contains the same "To" field 902, "From" field 904, "Subject" field 906, "Date" field 908 and "Body" field 910 as FIG. 9. However, the address of the "CC" field 1002 has been modified. Whereas the original address in the "CC" field 905 was "colleague@externalto.example.com", the address of the "CC" field 1002 is modified to be "colleague@example.com". Note that the "externalto" text, which indicates that the email message originated from a network external to the LAN 110 of the recipient computer 104 in this embodiment, has been extracted.

6. Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 11:
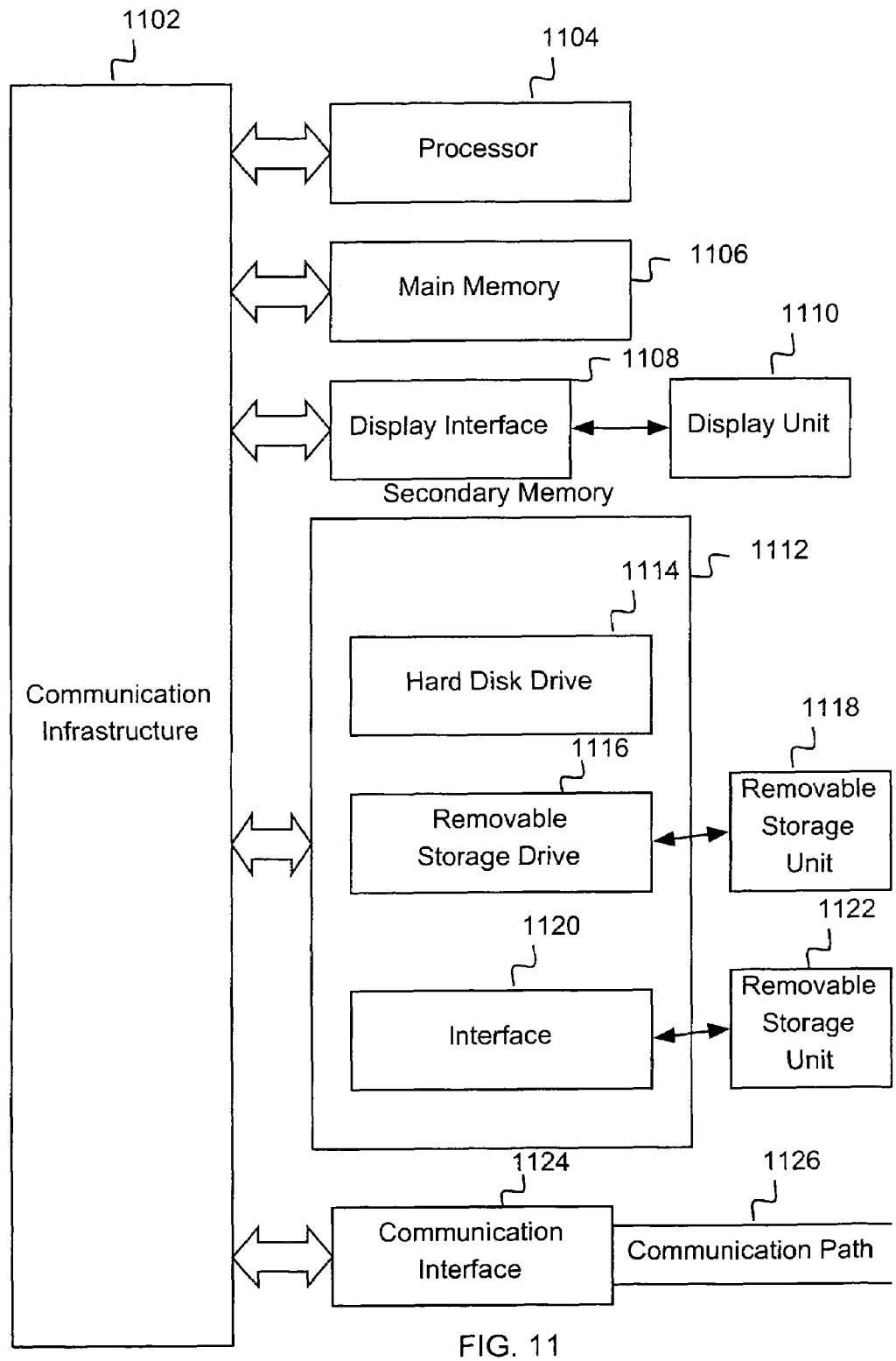
FIG. 11 is a block diagram of a computer system useful for implementing the present invention.

FIG. 11 is a block diagram of a computer system useful for implementing an embodiment of the present invention. The computer system of FIG. 11 includes one or more processors, such as processor 1104. The processor 1104 is connected to a communication infrastructure 1102 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1108 that forwards graphics, text, and other data from the communication infrastructure 1102 (or from a frame buffer not shown) for display on the display unit 1110. The computer system also includes a main memory 1106, preferably random access memory (RAM), and may also include a secondary memory 1112. The secondary memory 1112 may include, for example, a hard disk drive 1114 and/or a removable storage drive 1116, representing a floppy disk drive, a magnetic tape drive, an optical disk drive, etc. The removable storage drive 1116 reads from and/or writes to a removable storage unit 1118 in a manner well known to those having ordinary skill in the art. Removable storage unit 1118, represents, for example, a floppy disk, magnetic tape, optical disk, etc. which is read by and written to by removable storage drive 1116. As will be appreciated, the removable storage unit 1118 includes a computer usable storage medium having stored therein computer software and/or data.

In alternative embodiments, the secondary memory 1112 may include other similar means for allowing computer programs or other instructions to be loaded into the computer system. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to the computer system.

The computer system may also include a communications interface 1124. Communications interface 1124 allows software and data to be transferred between the computer system and external devices. Examples of communications interface 1124 may include a modem, a network interface (such as an Ethernet card), a communications port, a PCMCIA slot and card, etc. Software and data transferred via communications interface 1124 are in the form of signals which may be, for example, electronic, electromagnetic, optical, or other signals capable of being received by communications interface 1124. These signals are provided to communications interface 1124 via a communications path (i.e., channel) 1126. This channel 1126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1106 and secondary memory 1112, removable storage drive 1116, a hard disk installed in hard disk drive 1114, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1106 and/or secondary memory 1112. Computer programs may also be received via communications interface 1124. Such computer programs, when executed, enable the computer system to perform the features of the present invention as discussed herein. In particular, the computer programs, when executed, enable the processor 1104 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for identifying spoofed emails, the method comprising the steps of:

receiving an email addressed to a recipient in a first network, the email including a plurality of headers, wherein at least one of the plurality of headers includes a sender address;

determining whether the sender address indicates a mailbox from within the first network;

when the sender address indicates a mailbox from within the first network, modifying at least a portion of the sender address so as to produce a modified sender address that indicates to the recipient that the email is associated with a mailbox that is external to the first network; and sending the email with the modified sender address to the recipient, the modified sender address being visible to the recipient, wherein the step of determining comprises:

determining whether the sender address matches any one of a plurality of domains or sub-domains associated with the first network, and the step of modifying comprises:

modifying the sender address when the sender address matches any one of the domains or sub-domains associated with the first network.

2. A tangible computer readable storage medium encoded with a program for identifying spoofed emails, the program comprising instructions for performing a method comprising the steps of:

receiving an email addressed to a recipient in a first network, the email including a plurality of headers, wherein at least one of the plurality of headers includes a sender address;

determining whether the sender address indicates a mailbox from within the first network;

when the sender address indicates a mailbox from within the first network, modifying at least a portion of the sender address so as to produce a modified sender address that indicates to the recipient that the email is associated with a mailbox that is external to the first network; and sending the email with the modified sender address to the recipient, the modified sender address being visible to the recipient, wherein the determining step of the method comprises determining whether the sender address matches any one of a plurality of domains or sub-domains associated with the first network, and the modifying step of the method comprises modifying the sender address when the sender address matches any one of the domains or sub-domains associated with the first network.

\* \* \* \* \*